(12) United States Patent
Shi et al.

(10) Patent No.: US 8,694,986 B2
(45) Date of Patent: Apr. 8, 2014

(54) PROVIDING UPDATE NOTIFICATIONS ON DISTRIBUTED APPLICATION OBJECTS

(75) Inventors: Alan Shi, Redmond, WA (US); Srivatsan Parthasarathy, Seattle, WA (US); Biddappa Nanaiah Berera, Redmond, WA (US); Rajeet Nair, Redmond, WA (US); Rakesh Malhotra, Seattle, WA (US); Michael Michael, Houston, TX (US); Eric Joseph Winner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/326,878

(22) Filed: Dec. 15, 2011

(65) Prior Publication Data

US 2013/0159987 A1    Jun. 20, 2013

(51) Int. Cl.
  *G06F 9/44* (2006.01)
(52) U.S. Cl.
  USPC ........... 717/170; 717/168; 717/169; 717/172; 717/173
(58) Field of Classification Search
  None
  See application file for complete search history.

(56) References Cited

U.S. PATENT DOCUMENTS

| | | | |
|---|---|---|---|
| 6,424,354 | B1 | 7/2002 | Matheny et al. |
| 7,694,101 | B2* | 4/2010 | Lecomte et al. ............. 711/170 |
| 2003/0172368 | A1 | 9/2003 | Alumbaugh et al. |
| 2004/0187103 | A1 | 9/2004 | Wickham et al. |
| 2005/0120160 | A1* | 6/2005 | Plouffe et al. ..................... 711/1 |
| 2006/0265688 | A1 | 11/2006 | Carlson et al. |
| 2007/0150882 | A1 | 6/2007 | Pena et al. |
| 2009/0183182 | A1* | 7/2009 | Parthasarathy et al. ........ 719/321 |
| 2009/0199175 | A1* | 8/2009 | Keller et al. .................. 717/178 |
| 2011/0119668 | A1 | 5/2011 | Calder et al. |
| 2011/0209140 | A1* | 8/2011 | Scheidel et al. .............. 717/172 |

OTHER PUBLICATIONS

Title: "Method and System for effective provisioning of virtual appliances in a highly-virtualized datacenter", Authors et. al.: Disclosed Anonymously, IP.com No. IPCOM000211203D, Electronic Publication: Sep. 27, 2011.*
Title: "A Change Management Framework: Dependency Maintenance and Change Notification", Authors: Soon-Young Huh, et al., J. Systems Software 1996; 34:231-246, 1996 by Elsevier Science Inc.*
Author: Soon-Young Huh. Title: A Change Management Framework: Dependency Maintenance and Change Notification. Oublished in: J. Systems Software 1996; 34:231-246 0 1996 by Elsevier Science Inc. 655 Avenue of the Americas, New York, NY 10010.*

(Continued)

*Primary Examiner* — Isaac Tecklu
*Assistant Examiner* — Hossain Morshed
(74) *Attorney, Agent, or Firm* — David Andrews; Nicholas Chen; Micky Minhas

(57) ABSTRACT

The present invention extends to methods, systems, and computer program products for providing update notifications on distributed application objects. When a new version of an object is created that another object depends on, a notification can be added to the dependent object to alert a person that manages the dependent object of the creation of the updated object. Dependent objects can include template objects, such as virtual machine template objects that refer to virtual disk objects and service template objects that refer to one or more virtual machine template objects, as well as service instance objects that represent service instances that are instantiated from template objects. Versions of objects within a family can be identified by sharing a family name and having different releases. A timestamp is used to represent when an object is released to determine which version of an object is the newest version in a family.

20 Claims, 8 Drawing Sheets

(56) References Cited

OTHER PUBLICATIONS

"Data Center Networking —Managing a Virtualized Environment", Retrieved on: Sep. 1, 2011, Available at: http://www.enterasys.com/company/literature/datacenter-virtualized-wp.pdf.

"VMware vCenter Server—Unify and Simplify Virtualization Management", Retrieved on: Sep. 2, 2011, Available at: http://www.vmware.com/products/vcenter-server/features.html.

"A Best-Practice Guide to Understanding Your Integration Requirements", Retrieved on: Sep. 1, 2011, Available at: http://www.google.com/url?sa=t&source=web&cd=4&ved=0CCkQFjAD&url=http%3A%2F%2Fdownload.microsoft.com%2Fdownload%2F2%2F8%2F9%2F289DDDAC-2378-471C-8736-768DF3D76E5E%2FWP_Opalis_integration_Guide.

"Customizing Tivoli Service Automation Manager for VMware", Retrieved on: Sep. 1, 2011, Available at: http://publib.boulder.ibm.com/infocenter/tivihelp/v10r1/index.jsp?topic=%2Fcom.ibm.tsam.doc_7.2%2Frdp%2Ft_rdp_vcenter_cust.html.

Xuezhou, et al., "A Change Notification Framework Based on Agent for Information System", In Proceedings of 36th International Conference on Technology of Object-Oriented Languages and Systems, 2000, pp. 195-200.

\* cited by examiner

PROVIDING UPDATE NOTIFICATIONS ON DISTRIBUTED APPLICATION OBJECTS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some environments, many different physical resources are grouped together and virtualized to create a virtual computer system or "virtual machine". For example, a virtual machine can include a specified number of processors, a specified amount of memory, one or more virtual storage devices, applications or other components to be stored on the virtual storage devices, etc. To create a virtual machine one or more users specify the desired configuration for the virtual machine. This configuration can include setting a number of properties on a virtual machine instance such as a property that references a particular virtual storage device.

In this specification, a distinction is made between a virtual storage device and the contents of these devices (generally referred to below as virtual disks). A virtual hard drive is a virtual storage device whereas the content of a virtual hard drive is referred to as a virtual hard disk. A virtual hard drive is represented as a property on a virtual machine whereas a virtual hard disk is a file containing data such as an operating system used by the virtual machine. Similarly, virtual CD or DVD drives are represented as properties on a virtual machine whereas a virtual CD or virtual DVD is represented as a file (e.g. a .ISO for the contents of a DVD). Another form of virtual disk is a Virtual Machine Disk (VMDK).

To facilitate virtual machine creation, an instance of a virtual machine can be generated from a virtual machine template object (as opposed to requiring manual configuration of properties). A virtual machine template object can be thought of as a blueprint for creating virtual machines. The virtual machine template object can specify the desired physical resources and their configuration. For example, a virtual machine template object can include metadata for specifying the number of processors, the amount of memory, etc. A virtual machine template object can also identify that a virtual machine is to include a virtual hard drive (or other virtual storage device) as well as the contents that should be included within the virtual hard drive. For example, the virtual machine template object can reference a virtual hard disk object.

Additionally, service template objects can be used as blueprints for creating distributed applications. In this specification, the term distributed application is generally used interchangeably with the term service instance. A distributed application comprises a group of one or more virtual machines that are configured to implement desired functionality. Accordingly, a service template object can reference one or more virtual machine template objects from which one or more virtual machine instances are to be created to implement a distributed application. In this specification, including the figures, virtual machine template object and service template object are jointly referred to as template objects.

When a virtual machine is created from a virtual machine template object, the virtual machine is configured with the properties as defined in the virtual machine template object. Accordingly, a virtual machine template object can be used to ensure that many instances of a virtual machine are similarly configured. For example, a virtual machine template object can be defined once and many instances of a virtual machine can be generated from the virtual machine template object so that each instance has the same properties (e.g. a copy of the same virtual hard disk, the same number of processors and memory, etc.).

Similarly, a service template object can be defined once and many instances of a distributed application can be generated from the service template object so that each instance of the distributed application is comprised of the same number of virtual machines with the same configuration. Although not essential to an understanding of the present invention, a service template object can include a tier template object which references the virtual machine template objects. A tier is a group of virtual machines that are identically configured. Accordingly, a tier template object can reference a virtual machine template object and indicate the number of virtual machine instances that should be generated from the virtual machine template object.

The resources used to create a virtual machine are often designed and/or managed by different personas. For example, applications are generally created by developers. On the other hand, virtual hard disks are generally created by server administrators of the company that hosts virtual machines. Template objects are generally created by an IT administrator or other IT staff at a company desiring a virtual machine, and instances of the virtual machine are deployed by different IT staff at the company or even by another company wishing to use the company's template object.

Due at least in part to the number of different parties involved in the process of creating and deploying a virtual machine, it can be difficult to notify all relevant parties of changes to resources used to create the virtual machine. Some approaches to providing notifications of changed resources have involved traditional modes of communication such as email, phone, etc. These traditional approaches have high latency, and are tedious and error prone.

For example, it is generally time consuming for a server administrator to determine each template object that relies on a particular virtual hard disk and then notify each relevant party of a change to the virtual hard disk. Additionally, even if every relevant party is notified of the change (such as by email or phone), a party can easily forget to respond to the change or in some other way fail to modify a template object to use the updated virtual hard disk.

Similar problems exist when an updated template object is created. For example, each party that manages a service instance object that depends on the template object needs to be notified of the availability of an updated template object. As described, notifying these parties and having the notified parties also respond appropriately to the notification can be a tedious and error prone process.

BRIEF SUMMARY

The present invention extends to methods, systems, and computer program products for providing update notifications on objects used to create a distributed application. The present invention simplifies the process of notifying relevant parties of new or updated objects, and facilitates responding appropriately to such notifications.

In one embodiment, the creation of a new version of a virtual disk object is detected. The object represents a virtual disk for use in a distributed application. One or more template objects are identified. The one or more template objects depend on the virtual disk object. A notification is provided, to each of the one or more template objects, that indicates that the new version of the virtual disk object has been created.

In another embodiment, the creation of a new version of a template object is detected. The new version of the template object defines a distributed application. One or more service instance objects, which are generated from the template object, are identified. A notification is provided to each of the one or more service instance objects. The notification indicates that the new version of the template object has been created.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
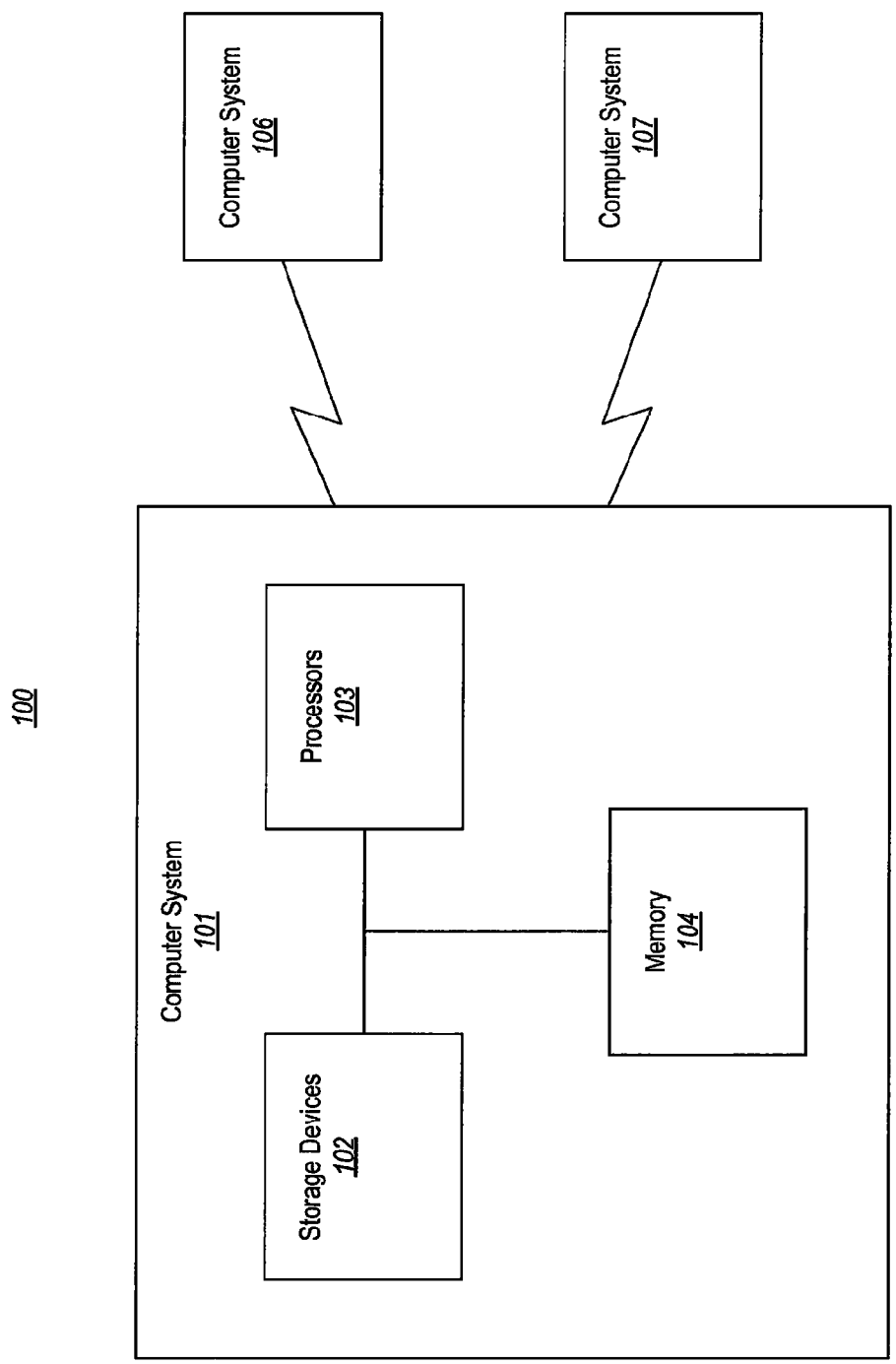
FIG. 1 illustrates an example computer architecture that facilitates providing update notifications on distributed application objects.

The present invention extends to methods, systems, and computer program products for providing update notifications on objects used to create a distributed application. The present invention simplifies the process of notifying relevant parties of new or updated objects, and facilitates responding appropriately to such notifications.

In one embodiment, the creation of a new version of a virtual disk object is detected. The object represents a virtual disk for use in a distributed application. One or more template objects are identified. The one or more template objects depend on the virtual disk object. A notification is provided, to each of the one or more template objects, that indicates that the new version of the virtual disk object has been created.

In another embodiment, the creation of a new version of a template object is detected. The new version of the template object defines a distributed application. One or more service instance objects, which are generated from the template object, are identified. A notification is provided to each of the one or more service instance objects. The notification indicates that the new version of the template object has been created.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates providing update notifications on distributed application objects. Referring to FIG. 1, computer architecture 100 comprises a computer system 101 that includes a plurality of interconnected processors, memory, and storage devices for creating and executing virtual machines. For example, computer system 101 includes storage devices 102, processors 103, and memory 104. Computer system 101 can be implemented in a cloud of computing systems. An example of computer system 101 can include the resources that make up Microsoft's System Center Virtual Machine Manager product.

Computer system 101 can be connected to other computer systems, such as computer systems 106 and 107 over a network, such as, for example, a Local Area Network ("LAN"), a Wide Area Network ("WAN"), and even the Internet. Accordingly, the other computer systems can communicate with computer system 101 using any available means, such as by creating message related data and exchanging message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. Such communications can include commands for interacting with an executing a virtual machine, or instructions for configuring a new or existing virtual machine within computer system 101.

Figure 2A:
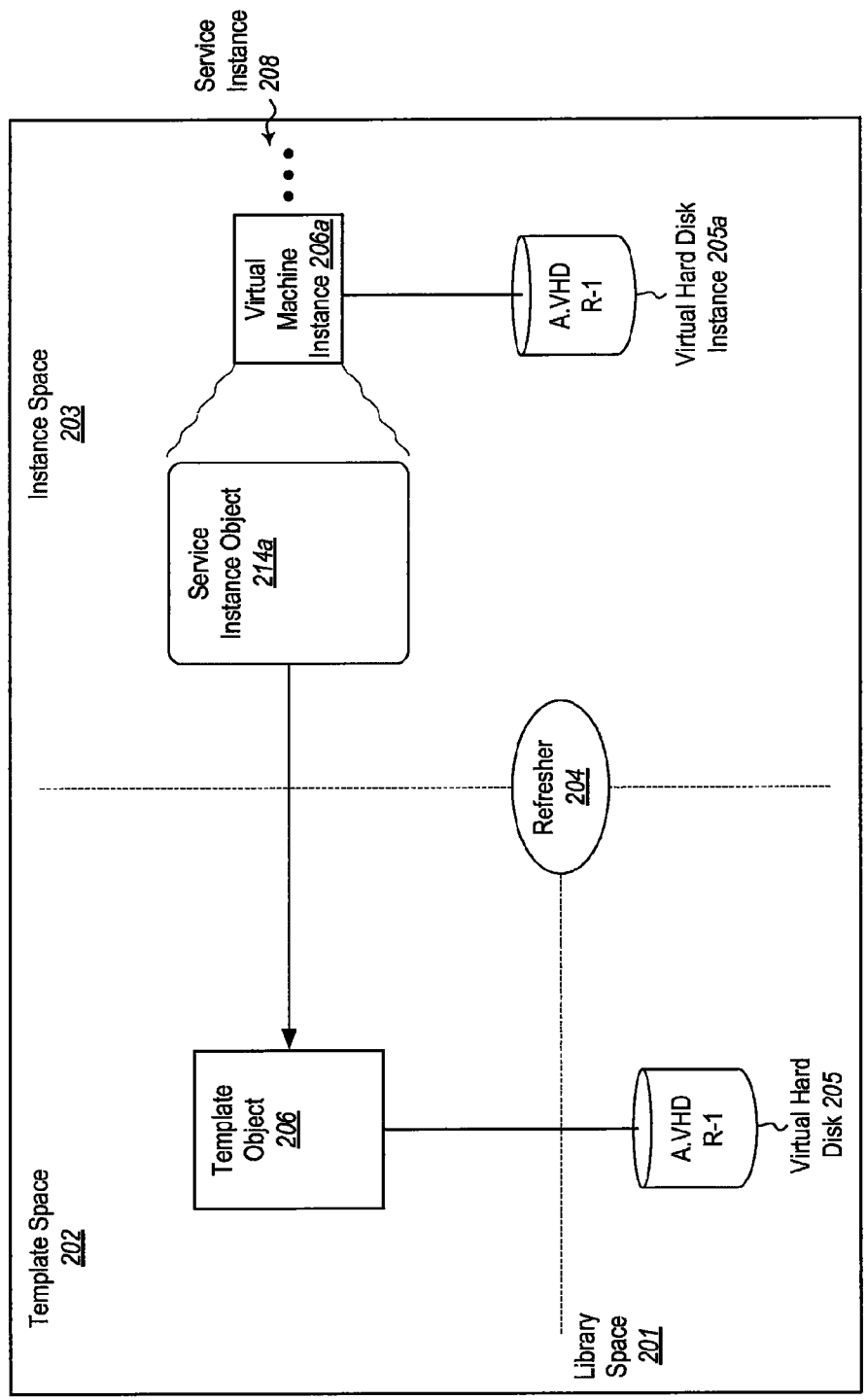
FIG. 2A illustrates various logical spaces in a computer system within the example computer architecture of FIG. 1.

FIG. 2A illustrates various logical spaces within computer system 101. Computer system 101 can include library space 201, template space 202, and instance space 203. FIG. 2A also illustrates that computer system 101 can include refresher 204 whose function will be described below.

Library space 201 stores objects which define virtual disks. For example, library space 201 can represent the physical location where the objects defining virtual hard disks, as well as other virtual disks such as virtual CDs or virtual DVDs, available within computer system 101 are stored. Library space 201 can also store other artifacts used for virtual machine creation such as applications, scripts, drivers, etc. As shown, library space 201 stores virtual hard disk object 205. A virtual hard disk (or other virtual disk) is a file storing the contents of the virtual hard disk such as an operating system. An instance of a virtual hard disk can be created from a virtual hard disk object (e.g. by copying the file representing the virtual hard disk to a host system that executes a virtual machine using the virtual hard disk). Virtual hard disk object 205 has a family name of A.VHD and a release of R-1. The use of family names and releases is described below.

Although the Figures illustrate the use of a virtual hard disk, any other type of virtual disk, such as a virtual DVD, can be used within embodiments of the present invention. Additionally, a virtual machine according to the present invention can use more than one virtual disk. The notification techniques described below can apply equally to each virtual disk.

Template space 202 stores defined template objects such as virtual machine template objects and service template objects. For example, template space 202 can represent the physical location where template objects are stored within computer system 101. In a specific embodiment, template space 202 can represent one or more database tables that store the component values of the various template objects that are defined in computer system 101 along with an identification of which component values are used by which template objects. In other embodiments, however, other data constructs can be used for template objects.

As shown, template space 202 includes template object 206. Template object 206 represents a virtual machine template object. A virtual machine template object identifies a virtual hard disk object (and possibly other virtual disk objects), specifies a number of processors, an amount of memory, and applications or components to be installed on an instance of the virtual hard disk, among other things. The virtual machine template object is used when an instance of a virtual machine is created. For example, template object 206 can identify virtual hard disk object 205 indicating that virtual machine instances generated from template object 206 will include a virtual hard disk instantiated from virtual hard disk object 205.

Although template object 206 is described as representing a virtual machine template object, for purposes of the present invention, template object 206 can also represent a service template object. For example, a service template object comprises one or more virtual machine template objects. Specifically, a service template object identifies one or more virtual machine template objects that will make up a service instance created from the service template object. A service template object also defines other properties and configuration settings for defining the service instance such as how each virtual machine communicates with the other virtual machines in the service instance.

Accordingly, it can be said that a service template object indirectly references each of the virtual disk objects that are directly referenced by the virtual machine template objects referenced in the service template object. Therefore, notifications of updates to a virtual disk object can be provided similarly to both the virtual machine template object that directly references the virtual disk object and the service template object that references any virtual machine template object that references the virtual disk object. The remainder of the specification, as well as the claims, will generally refer to template objects. Such references should be construed to include both virtual machine and service template objects unless otherwise defined.

Instance space 203 contains service instances, such as service instance 214, which are a collection of one or more virtual machine instances. For example, instance space 203 can represent the physical processors, memory, and storage where virtual machine instances are executed. As shown, instance space 203 can also include service instance objects. A service instance object is a data construct that represents a service instance. For example, service instance object 214a can represent service instance 214. Service instance 214 was created from template object 206 and contains virtual machine instance 207. Virtual machine instance 207 references virtual hard disk instance 205a. Although service instance 214 is shown as including a single virtual machine instance, any number of virtual machine instances could make up service instance 214.

Within this specification, service instance and distributed application are intended generally to refer to similar things. A distributed application is executed within a collection of one or more virtual machine instances. For example, a multiple tier distributed application can comprise one or more virtual machines that implement a front end of the application, one or more virtual machines that implement a middle layer of the application, and one or more virtual machines that implement a database backend of the application. In this example, each of the virtual machines of the multiple tier distributed application could be generated from a virtual machine template object. A service template object that represents the distributed application can reference each of these virtual machine template objects.

To create virtual machine instance 207, virtual hard disk instance 205a is instantiated from virtual hard disk object 205 identified in template object 206, processors and memory are allocated as defined in template object 206, and applications and components defined in template object 206 are installed on virtual hard disk instance 205a.

Figure 2B:
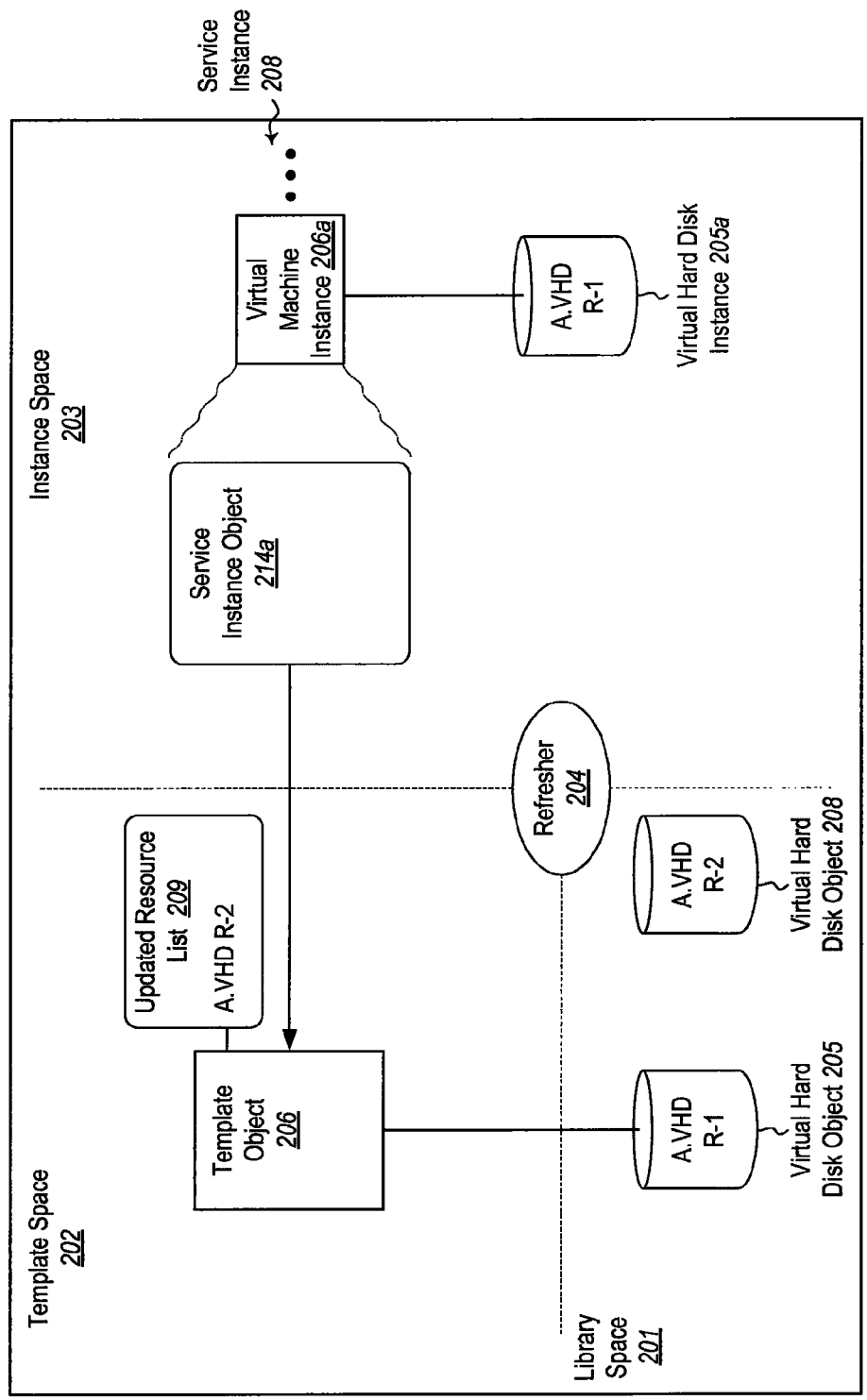
FIGS. 2B-2E illustrate how notifications are provided to objects within the logical spaces in the computer system.

FIG. 2B illustrates how notifications are provided on template objects when an updated virtual hard disk object is created. FIG. 2B is similar to FIG. 2A with the addition of virtual hard disk object 208 and updated resource lists 209.

Virtual hard disk object 208 comprises an update to virtual hard disk object 205. For example, virtual hard disk object 205 can contain an initial version of an operating system whereas virtual hard disk object 208 can contain a patched version of an operating system. FIG. 2B shows that virtual hard disk object 208 has the same family name (A.VHD) but a different release (R-2) than virtual hard disk object 205.

Updated resource list 209 comprises a list of updates to resources on which template object 206 depends. For example, as described above, template object 206 identifies virtual hard disk object 205. Because virtual hard disk object 208 is an updated version of virtual hard disk object 205, an entry is added to updated resource list 209 that identifies virtual hard disk object 208 as an available update to virtual hard disk object 205. A notification can identify an updated object by using the family name and release of the object as fully described below.

Although FIGS. 2A and 2B illustrate that a single template object depends on virtual hard disk object 205 and that a single service instance object 214a depends on template object 206, multiple template objects and service instance objects can depend on a single virtual hard disk object and a single template object respectively.

Refresher 204 comprises a module that can execute periodically or at other intervals to determine whether any updates to virtual hard disk objects or template objects have been created. When refresher 204 identifies an updated object, it updates the appropriate updated resource list. For example, refresher 204 can add the entry to updated resource list 209 when virtual hard disk object 208 is created.

Embodiments of the present invention can also provide a mechanism for providing immediate notifications to objects. For example, if a server administrator creates a new version of a virtual hard disk object, he can cause notifications to be raised immediately on each template object that depends on the virtual hard disk object rather than waiting until refresher 204 runs again.

In addition to adding an entry to an updated resource list associated with an object, embodiments of the present invention can also set a flag within the object to notify the object that its updated resource list has been modified. This flag can remain set as long as the object's updated resource list contains a notification.

Figure 2C:
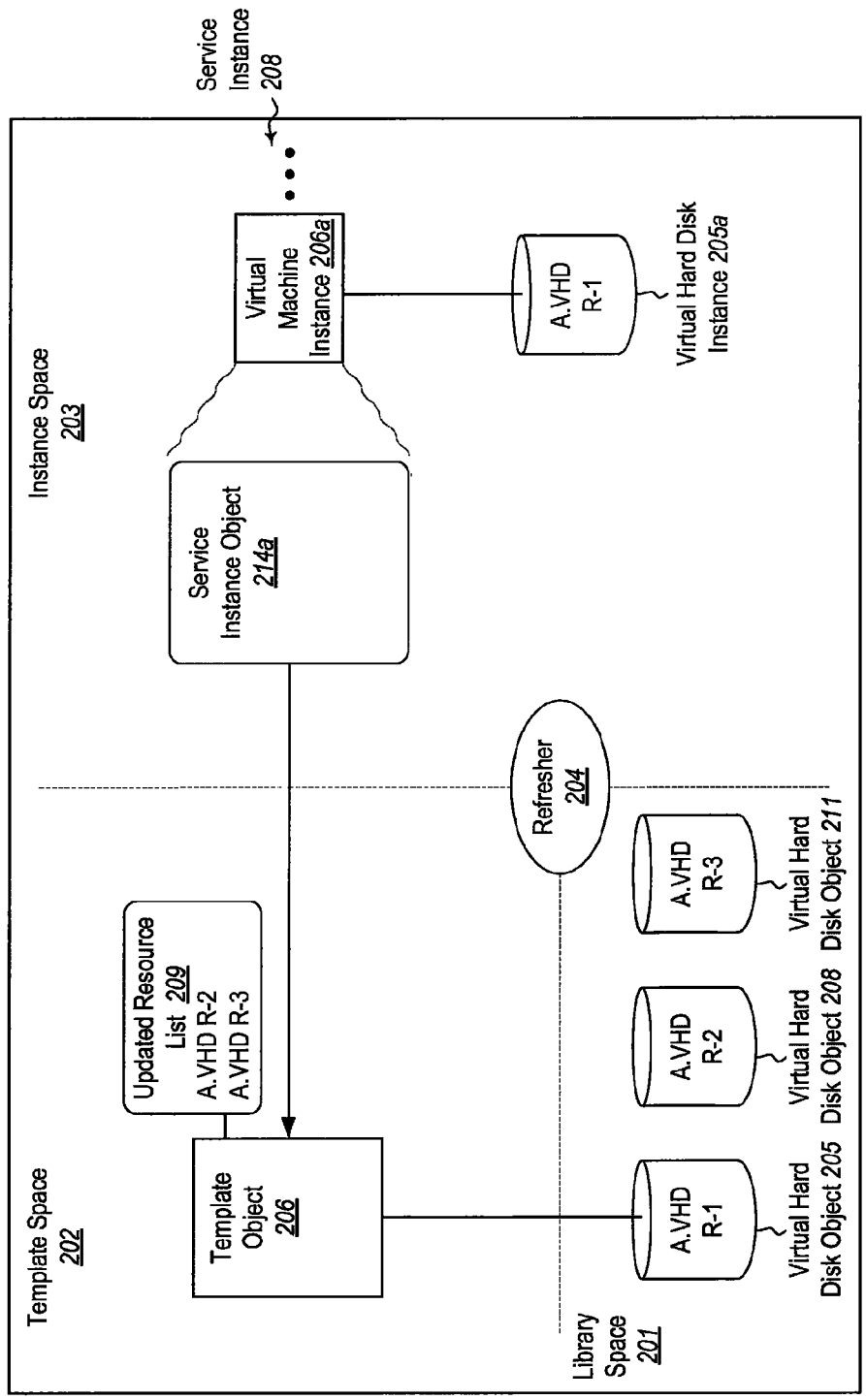

FIG. 2C illustrates that another virtual hard disk object 211 has been added to library space 201. Virtual hard disk object 211 comprises an update to virtual hard disk object 208. FIG. 2C shows that virtual hard disk object 211 has the same family name (A.VHD) as virtual hard disk objects 205 and 208, but a different release (R-3) than virtual hard disk objects 205 and 208.

As a result of the addition of virtual hard disk object 211, FIG. 2C shows that updated resource list 209 has been modified. Updated resource list 209 now includes two notifications, one for each of virtual hard disk objects 208 and 211.

Figure 2D:
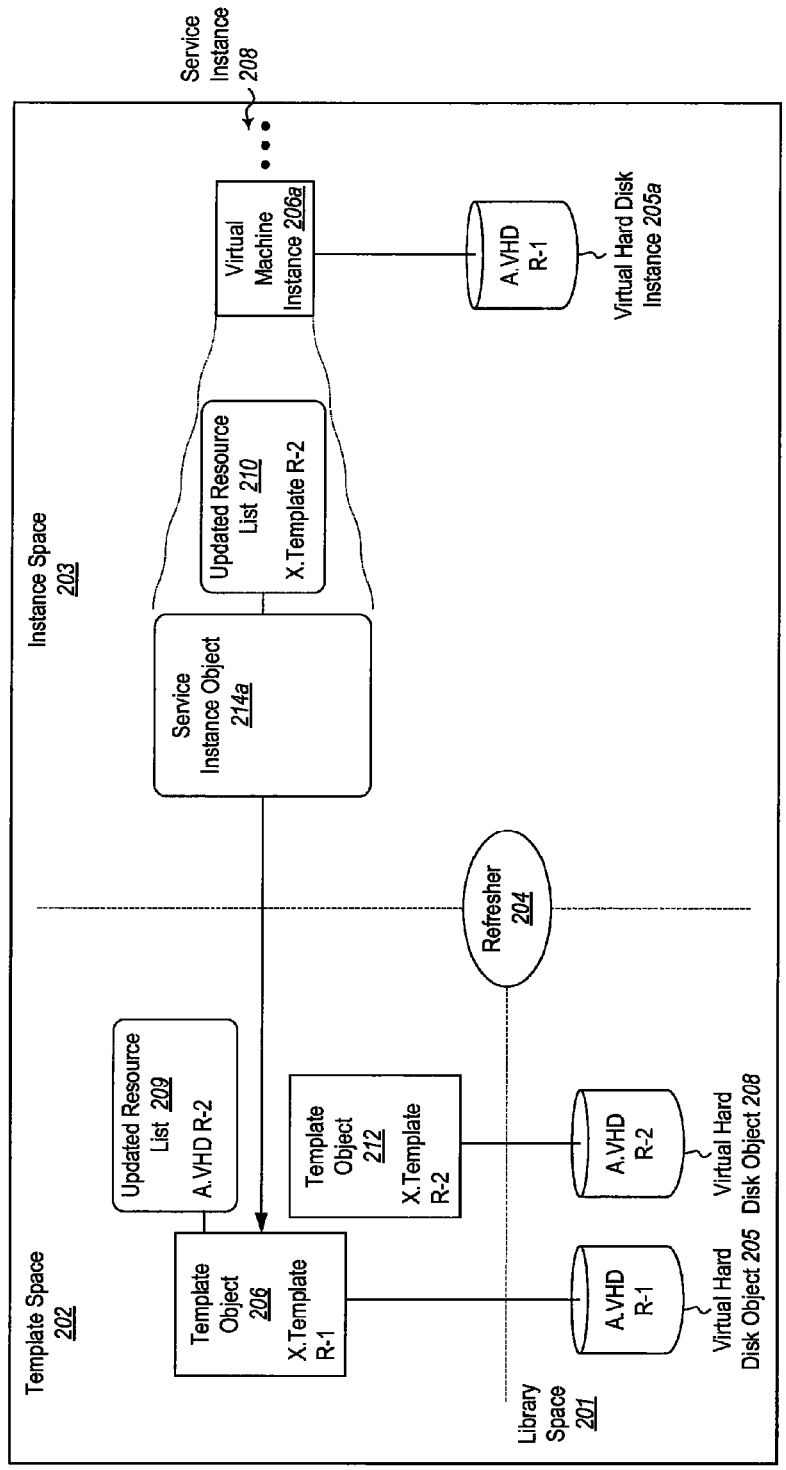

FIG. 2D illustrates how notifications are provided on service instance objects when an updated template object is created. FIG. 2D is similar to FIG. 2B but includes the addition of a new template object 212 in template space 202 and an updated resource list 210. In FIG. 2D, both template objects 206 and 212 are illustrated as including a family name and release. Template object 212 is an updated version of template object 206 as indicated by the fact that both objects share a family name (X.Template) but have a different release (R-1 and R-2 respectively). The update can be any change to template object 206, however, FIG. 2D illustrates that the update in template object 212 is a reference to virtual hard disk object 208.

A notification of the release of template object 212 can be set on service instance object 214a in a similar manner as described above. For example, as shown, updated resource list 210 now includes a notification for template object 212.

If updated resource list 210 is empty prior to adding the notification for template object 212, the flag in service instance object 214a can be set to indicate to service instance object 214a that one or more notifications are in updated resource list 210. However, if updated resource list 210 already contains notifications, the flag will already be set. The notification for template object 212 can also be dismissed as described below.

Although FIG. 2D does not show an updated resource list for template object 212, an updated resource list for template object 212 could appear similar to updated resource list 209. For example, if template object 212 also identified virtual hard disk object 205, a notification for virtual hard disk object 208 could be added to the updated resource list for template object 212. Of course, if template object 212 identified virtual hard disk object 208, no such notification would be necessary.

Figure 2E:
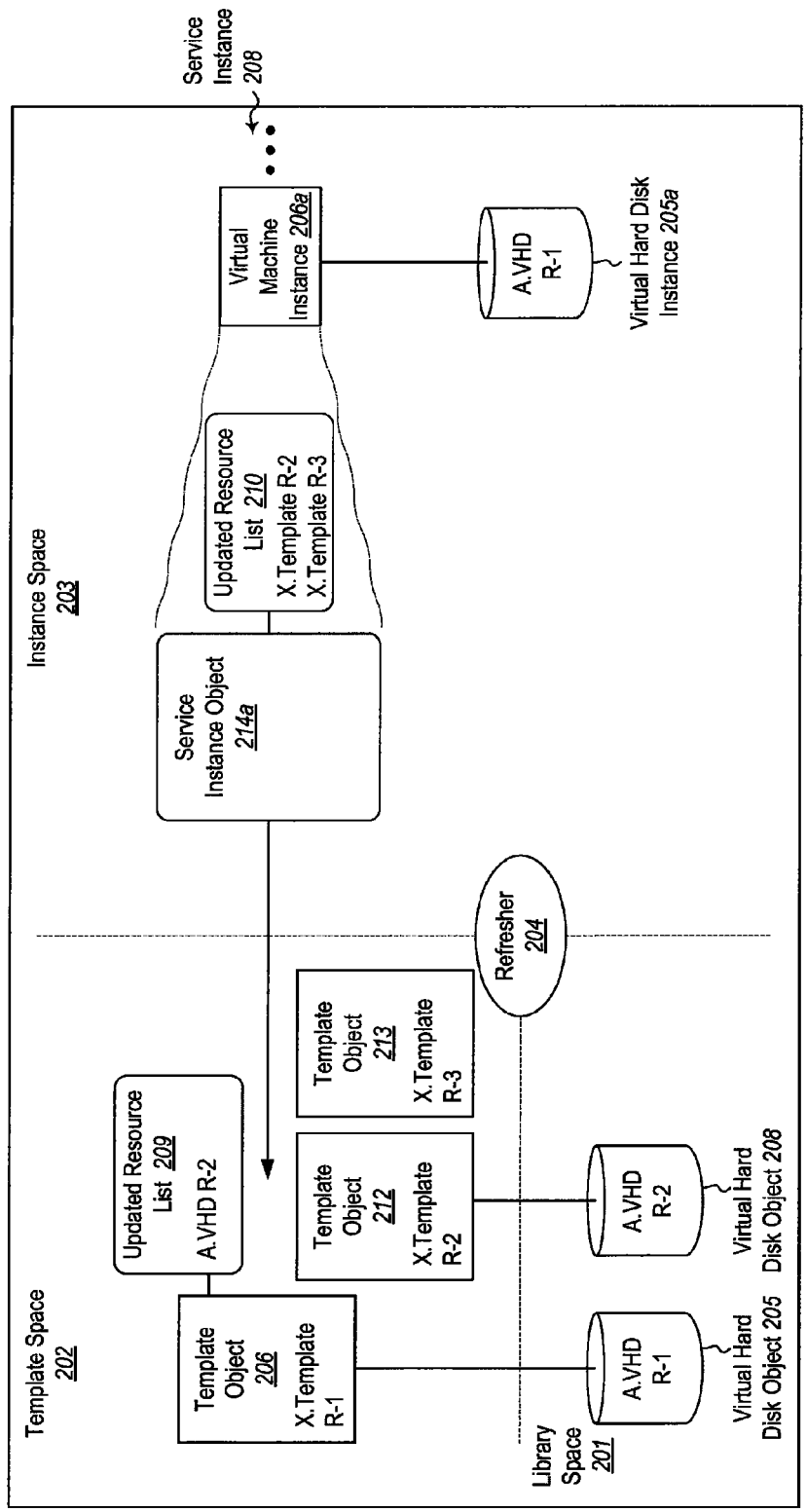

FIG. 2E illustrates how a notification can be dismissed from an object's updated resource list. FIG. 2E differs from FIG. 2D in that another updated template object 213 has been added to template space 203. Template object 213 is also an update to template object 206 as indicated by template object 213 sharing the same name but a different release as template object 206. As shown updated resource list 210 includes a newly added notification for template object 213, but that the notification for template object 212 has been dismissed.

FIG. 2E shows the dismissed notification as being lined through for sake of clarity, however, the notification can also be removed from updated resource list 210. A manager of service template object 214a can dismiss a notification for any reason. For example, a manager could also dismiss the notification for template object 212 in updated resource list 210.

In some embodiments of the invention as shown in FIG. 2E, only notifications in a service instance object's updated resource list can be dismissed while notifications in a template object's updated resource list cannot be dismissed. In other embodiments, notifications in a template object's updated resource list can be dismissed as well.

In addition to adding notifications to updated resource lists, refresher 204 can also remove stale notifications. For example, referring again to FIG. 2E, if template object 213 were deleted, refresher 204 could detect the deletion and update updated resource list 210 accordingly. Similarly, if a virtual disk were deleted from library space 201, any notifications on template objects of the deleted virtual disk could be deleted. Although the above description describes the notification of available updates thus allowing manual resolution of the updates, in some embodiments of the present invention, an available update can be automatically applied to a template or service instance object. In such scenarios, rather than notify a person of the available update, a notification that the update will be applied may be provided. Whether an available update is automatically applied can be based on business intelligence and/or defined metrics.

Additionally, in some embodiments of the present invention, a notification can be provided on a service instance object of an updated virtual disk object. In other words, when an updated virtual disk becomes available, in addition to providing a notification on any template objects that depend on a previous version of the virtual disk, the invention can provide a similar notification on any service instance objects that depend on a previous version of the virtual disk.

To identify resources and updates to resources within library space 201 and template space 202, a naming scheme is used. Within these spaces, each resource is identified with a family name and a release. A family name identifies a set of related resources. An example of a family name is "Windows Server 2008." The release identifies a specific version of a resource in a family. For example, the "Windows Server 2008" family can comprise a virtual hard disk object having a family name of "Windows Server 2008" and a release of "RTM," and another virtual hard disk object having the same family name but a release of "SP1." By sharing a family name, the system of the present invention can know that the two virtual hard disk objects are related.

Additionally, each resource is assigned a timestamp indicating the first time the resource is published. Publishing a resource refers to the act of making the resource available for use. For example, a template object could be created (i.e. defined) within template space 202, but may not be published for use until a specified date. This date of publication is the date used for the timestamp. In other embodiments, however, the date of creation of a resource could be used as the timestamp. For example, the presence of a disk object in library space 201 can constitute publishing.

This timestamp enables the system to know which resource is the most recent version in the family. For example, using the "Windows Server 2008" family example above, the virtual hard disk object having a release of "SP1" can have a timestamp that is later in time than the virtual hard disk object having a release of "RTM."

When refresher 204 searches for new resources, it can use the timestamp associated with each resource to determine whether new resources have been created and whether notifications are required. For example, refresher 204 can detect that a template object depends on a virtual hard disk having a family name and release of "Windows Server 2008" and "RTM." When refresher 204 detects that a virtual hard disk having the same family name and a release of "SP1" has a timestamp that is later than the timestamp of the release "RTM" version, refresher 204 can raise a notification on the template object by adding the notification to its updated resource list and setting the flag if necessary.

As can be seen, this process of automatically raising notifications on objects is an efficient means for notifying the relevant personas of the availability of updated resources. The updated resource lists of the objects managed by a persona can be displayed within a user interface of an application used by the relevant persona. The user interface can also provide means for allowing the persona to generate a new template object or a new service instance object. Accordingly, updated resources can be more quickly and efficiently deployed in a virtual machine instance.

Figure 3:
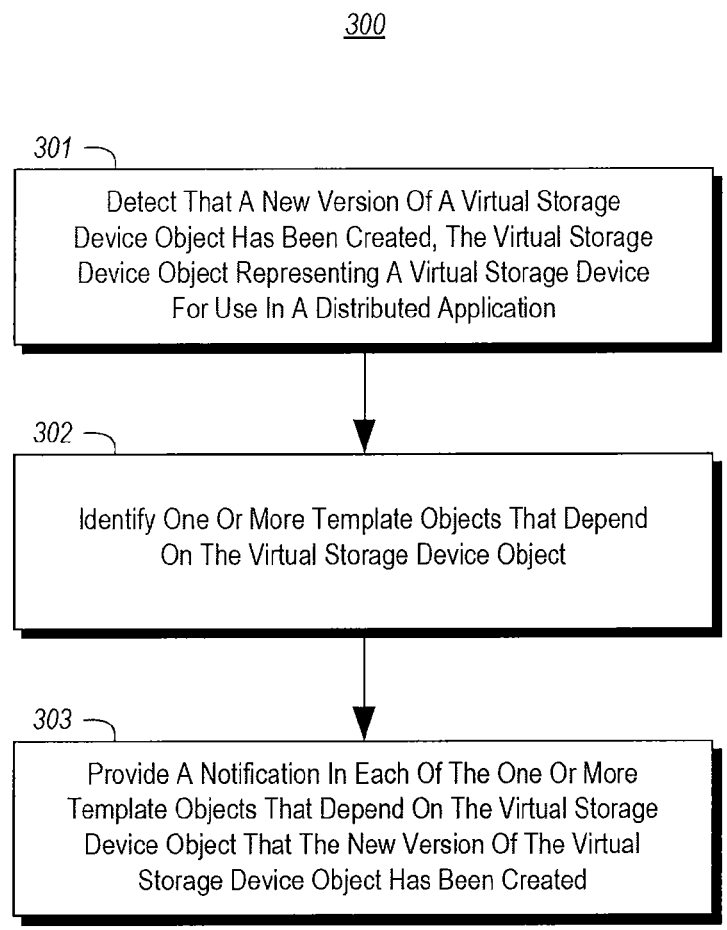
FIG. 3 is a flowchart of a method for providing a notification of an update to a virtual disk object to one or more template objects that depend on the virtual disk object.

FIG. 3 illustrates a flow chart of an example method 300 for providing a notification of an update to a virtual disk object to one or more template objects that depend on the virtual disk object. Method 300 will be described with reference to FIG. 2B.

Method 300 includes an act 301 of detecting that a new version of a virtual disk object has been created. The virtual disk object represents a virtual disk for use in a distributed application. For example, refresher 204 can detect that virtual hard disk object 208 has been created. Refresher can also detect that virtual hard disk object 208 is a newer version of virtual hard disk object 205 based on a family name, release, and timestamp defined in each object.

Method 300 includes an act 302 of identifying one or more template objects that depend on the virtual disk object. For example, refresher 204 can identify that template object 206 depends on virtual hard disk object 205.

Method 300 includes an act 303 of providing a notification in each of the one or more template objects that depend on the virtual disk object that the new version of the virtual disk object has been created. For example, refresher 204 can cause a notification of the creation of virtual hard disk object 208 to be added to updated resource list 209. Refresher 204 can also set a flag in updated resource list 209 if updated resource list 209 was previously empty prior to the notification for virtual hard disk object 208 being added.

Figure 4:
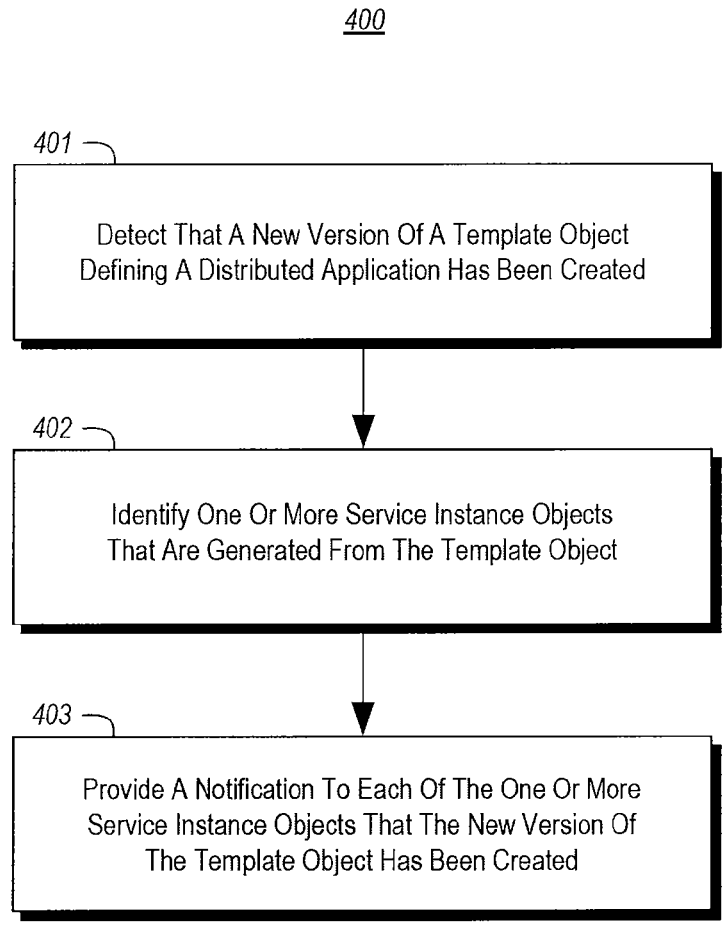
FIG. 4 is a flowchart of a method for providing a notification of an update to a template object to one or more service instance objects that are generated from the template object.

FIG. 4 illustrates a flow chart of an example method 400 for providing a notification of an update to a template object to one or more service instance objects that are generated from the template object. Method 400 will be described with reference to FIG. 2E.

Method 400 includes an act 401 of detecting that a new version of a template object defining a distributed application has been created. For example, refresher 204 can detect that template object 212 has been created. Refresher can also detect that template object 212 is a newer version of template object 206 based on a family name, release, and timestamp defined in each object.

Method 400 includes an act 402 of identifying one or more service instance objects that are generated from the template object. For example, refresher 204 can identify that service instance object 214a was generated from template object 206.

Method 400 includes an act 403 of providing a notification to each of the one or more service instance objects that the new version of the template object has been created. For example, refresher 204 can cause a notification of the creation of template object 212 to be added to updated resource list 210. Refresher 204 can also set a flag in updated resource list 210 if updated resource list 210 was previously empty prior to the notification for template object 212 being added.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system executing a plurality of distributed applications that are each instantiated from a template object, the template object defining a plurality of objects that each represent a component of the corresponding distributed application, a method for providing a notification of an update to an object that represents a virtual storage device, the method comprising:
   detecting that a new version of a virtual disk object has been created, the virtual disk object representing a virtual disk for use in a distributed application, the virtual disk object comprising a file containing data representing contents of a virtual hard drive;
   identifying one or more template objects that depend on the virtual disk object; and
   providing a notification in each of the one or more template objects that depend on the virtual disk object that the new version of the virtual disk object has been created.

2. The method of claim 1, wherein the virtual disk object includes an identifier of a family name and an identifier of a release of the object.

3. The method of claim 2, wherein detecting that a new version of an virtual disk object for use in a distributed application has been created further comprises detecting that an object having the same identifier of the family name and a different identifier of a release has been created.

4. The method of claim 3, wherein detecting that a new version of an virtual disk object for use in a distributed application has been created further comprises detecting that a timestamp associated with the new version of the object is more recent than a timestamp associated with the virtual disk object.

5. The method of claim 2, wherein identifying one or more template objects that depend on the virtual disk object further comprises identifying one or more template objects that include a reference to the identifier of the family name and the identifier of the release of the virtual disk object.

6. The method of claim 1, wherein providing a notification in each of the one or more template objects that depend on the virtual disk object that the new version of the virtual disk object has been created further comprises setting a flag in each of the one or more template objects that depend on the virtual disk object.

7. The method of claim 1, wherein each of the one or more template objects comprise a virtual machine template object or a service template object.

8. The method of claim 1, wherein the new version of the virtual disk object comprises a patch to a virtual hard disk represented by the object.

9. At a computer system including one or more processors and system memory, the computer system executing a plurality of distributed applications that are each instantiated from a template object that defines a plurality of objects that each represent a component of the corresponding distributed application, a method for providing a notification of an update to a template object to one or more service instance objects that represent a service instance that was generated from the template object, the method comprising:
   detecting that a new version of a template object defining a distributed application has been created;
   identifying one or more service instance objects that represent a service instance that was generated from the template object; and
   providing a notification to each of the one or more service instance objects that the new version of the template object has been created.

10. The method of claim 9, further comprising:
    in conjunction with providing the notification to each of the one or more service instance objects, providing an option to dismiss the notification to each of the one or more service instance objects.

11. The method of claim 9, wherein the template object includes an identifier of a family name and an identifier of a release of the template object.

12. The method of claim 11, wherein detecting that a new version of a template object defining a distributed application has been created further comprises detecting that a template object having the same identifier of the family name and a different identifier of a release has been created.

13. The method of claim 11, wherein detecting that a new version of a template object defining a distributed application has been created further comprises detecting that the new version of the template object has been published and that a timestamp associated with the new version of the template object is more recent than a timestamp associated with the template object.

14. The method of claim 11, wherein identifying one or more service instance objects that are generated from the template object further comprises identifying one or more service instance objects that include a reference to the identifier of the family name and the identifier of the release of the template object.

15. The method of claim 9, wherein providing a notification to each of the one or more service instance objects that the new version of the template object has been created further comprises setting a flag in each of the one or more service instance objects.

16. The method of claim 9 wherein the template object includes a reference to a virtual disk object, and the new version of the template object includes a reference to a new version of a virtual disk object.

17. At a computer system including one or more processors and system memory, the computer system executing a plurality of distributed applications that are each instantiated from a template object that defines a plurality of objects that each represent a component of the corresponding distributed application, a method for identifying a new version of an object used in an instantiated distributed application, the method comprising:
   accessing an identifier of a family name and an identifier of a release of an object, wherein an instance object used in the distributed application is based upon the object;

determining that a different version of the object has been created by identifying another object having the same identifier of the family name and a different identifier of a release;

determining that the different version of the object is a new version of the object by comparing a timestamp of the different version of the object to a timestamp of the object; and upon determining that the different version of the object is a new version of the object, providing a notification to the instance object used in the distributed application that a new version of the object has been created.

18. The method of claim 17, wherein the object is a virtual disk object that represents a version of a virtual disk, and the new version of the object represents a patched version of the virtual disk.

19. The method of claim 18, wherein providing a notification to the instance object used in the distributed application comprises providing a notification to one or more template objects that reference the identifier of the family name and the identifier of the release of the object.

20. The method of claim 17, wherein the object is a template object, and wherein providing a notification to the instance object used in the distributed application comprises providing a notification to one or more service instance objects that are instantiated from the template object.

* * * * *